United States Patent
Ryoo et al.

(10) Patent No.: US 9,910,711 B1
(45) Date of Patent: Mar. 6, 2018

(54) METHOD AND COMPUTING DEVICE FOR MANAGING SIZE OF THREAD POOL DYNAMICALLY

(71) Applicant: TMAXSOFT. CO., LTD., Gyeonggi-do (KR)

(72) Inventors: Kyoung Min Ryoo, Gyeonggi-do (KR); Moon Namkoong, Gyeonggi-do (KR); Hee Jin Lee, Seoul (KR); Kyung Koo Yoon, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 0 days.

(21) Appl. No.: 15/657,648

(22) Filed: Jul. 24, 2017

(30) Foreign Application Priority Data

Jul. 17, 2017  (KR) .......................... 10-2017-0090497

(51) Int. Cl.
*G06F 9/455* (2006.01)
*G06F 9/46* (2006.01)
*G06F 9/50* (2006.01)

(52) U.S. Cl.
CPC ............ *G06F 9/5038* (2013.01); *G06F 9/505* (2013.01); *G06F 2209/5011* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 9,354,931 | B1* | 5/2016 | Ryoo | G06F 9/5061 |
| 2004/0139434 | A1* | 7/2004 | Blythe | G06F 9/505 |
| | | | | 718/100 |
| 2004/0154020 | A1* | 8/2004 | Chen | G06F 9/5027 |
| | | | | 718/107 |
| 2008/0235693 | A1* | 9/2008 | Proctor | G06F 9/4881 |
| | | | | 718/103 |
| 2009/0070766 | A1* | 3/2009 | Berman | G06F 9/505 |
| | | | | 718/104 |
| 2011/0302112 | A1* | 12/2011 | Shan | G06Q 10/067 |
| | | | | 706/12 |
| 2016/0092263 | A1 | 3/2016 | Gleyzer et al. | |

FOREIGN PATENT DOCUMENTS

KR    10-1576628    12/2015

* cited by examiner

*Primary Examiner* — Bradley Teets
(74) *Attorney, Agent, or Firm* — Hush Blackwell LLP

(57) ABSTRACT

A method for managing a thread pool size dynamically using elemental task throughputs is provided. The method includes steps of: a computing device (a) calculating a first representative task throughput corresponding to a first group including elemental task throughputs during the first time section, and then increasing a maximum thread value for the first time section and setting it as a maximum thread value for the second time section; (b) calculating a second representative task throughput corresponding to a second group including elemental task throughputs during the second time section; and (c) comparing the first and the second representative task throughput and then, if the latter is greater than the former by an amount equal to or greater than a preset first threshold value, increasing the maximum thread value for the second time section and setting it as a maximum thread value for a third time section.

20 Claims, 6 Drawing Sheets

US 9,910,711 B1

METHOD AND COMPUTING DEVICE FOR MANAGING SIZE OF THREAD POOL DYNAMICALLY

CROSS REFERENCE TO RELATED APPLICATION

This application claims priority to and incorporates herein by reference all disclosure in Korean Patent Application No. 10-2017-0090497 filed Jul. 17, 2017.

FIELD OF THE INVENTION

The present invention relates to a method for managing a size of thread pool dynamically; and more particularly, to the method for managing a thread pool size dynamically by using one or more elemental task throughputs which represent the number of requests per unit time outputted from a task queue, the unit time being included in a first time section and a second time section, the method including steps of: (i) calculating at least one first representative task throughput corresponding to a first group including one or more elemental task throughputs during the first time section, and then increasing a maximum thread value for the first time section and setting it as a maximum thread value for the second time section; (ii) calculating at least one second representative task throughput corresponding to a second group including one or more elemental task throughputs during the second time section; and (iii) comparing the first representative task throughput and the second representative task throughput and then, if the second representative task throughput is determined to be greater than the first representative task throughput by an amount equal to or greater than a preset first threshold value, increasing the maximum thread value for the second time section and setting it as a maximum thread value for a third time section; and the computing device using the same.

BACKGROUND OF THE INVENTION

A thread is a unit of flow run in a process, and is information needed for handling a particular service request. The thread includes a program counter, a register set, a stack, and a thread ID for handling a particular service request, and also shares resources like code, data, and files with other thread.

Every time a request is acquired from a client, a conventional server creates a thread and processes the request by using the thread, and this mechanism is effective enough to perform most of tasks. However, in case of a server having massive connections with clients, a time required for creating and discarding threads exceeds a time for processing requests, which causes lower-than-usual performance of a system. Further, when the requests from the clients rise abruptly, creating threads for each of the requests makes the number of the threads also rise excessively, and this necessitates scheduling which results in an overhead of the system.

To solve such a problem, a thread pool was suggested in which a limited number of threads is created in advance and the threads are reused without being discarded.

The thread pool is a thread set which includes at least one thread, in which used threads are not discarded but allocated to other tasks to thereby be reused. Specifically, the way the thread pool works is as follows: the thread pool provides a processor with a thread to allow the processor to execute a specific task, and if the processor finishes the specific task and returns the thread to the thread pool, the thread pool awaits till it receives another task.

The thread pool manages information on a minimum size (minimum thread value) of threads which it should keep at minimum, and information on a maximum size (maximum thread value) of threads which is a maximum number of threads it can create. However, it is very difficult to determine the appropriate numbers of the minimum thread value and the maximum thread value that optimize the performance of a server.

A conventional method was mostly: pre-setting the minimum thread value and the maximum thread value according to number and types of service requests, measuring performance, and determining the optimal number of threads utilizing the measured performance. However, such a method which depends on a performance record is not suitable for determining appropriate minimum or a maximum thread values because time for proper experiment is required for accumulation of the performance record and even then accuracy of the record is not guaranteed in a web environment that changes fast in real-time.

Further, according to another conventional technique, when the number of the threads is increased, whether the size of the task queue decreases is determined, and if the size decreases, the maximum thread value at the time is determined to be acceptable and the number of the threads is not increased any more. However, it has a disadvantage of uninterrupted increase of the sizes of the threads and the task queues if the CPU usage is at one hundred percent, as capacity to process requests does not change even though the number of the threads is increased.

Therefore, the inventor of the present invention suggests a method and a computing device for dynamically managing the size of the thread pool by using the number of requests outputted from the task queues.

SUMMARY OF THE INVENTION

It is an object of the present invention to solve all the aforementioned problems.

It is another object of the present invention to provide a technology that can improve efficacy of a system by determining an optimal size of a thread pool in a web environment that changes fast in real-time.

It is still another object of the present invention to provide a solution to a problem of uninterrupted increase of the sizes of the threads and the task queues, even if the CPU usage is at one hundred percent, that occurs when an optimal number of maximum threads is determined by considering only the size of the task queues based on the number of requests outputted from the task queues.

In accordance with one aspect of the present invention, there is provided a method for managing a thread pool size dynamically by using one or more elemental task throughputs which represent the number of requests per unit time outputted from a task queue, the unit time being included in a first time section and a second time section, including steps of: (a) a computing device performing a function of calculating at least one first representative task throughput corresponding to a first group including one or more elemental task throughputs during the first time section, and then increasing a maximum thread value for the first time section and setting it as a maximum thread value for the second time section; (b) the computing device performing a function of calculating at least one second representative task throughput corresponding to a second group including one or more elemental task throughputs during the second time section;

and (c) the computing device comparing the first representative task throughput and the second representative task throughput and then, if the second representative task throughput is determined to be greater than the first representative task throughput by an amount equal to or greater than a preset first threshold value, increasing the maximum thread value for the second time section and setting it as a maximum thread value for a third time section.

In accordance with another aspect of the present invention, there is provided a computing device for managing a thread pool size dynamically by using one or more elemental task throughputs which represent the number of requests per unit time outputted from a task queue, the unit time being included in a first time section and a second time section, including: a communication part for acquiring a task request; and a processor for performing a function of (a) calculating at least one first representative task throughput corresponding to a first group including one or more elemental task throughputs during the first time section, and then increasing a maximum thread value for the first time section and setting it as a maximum thread value for the second time section; (b) calculating at least one second representative task throughput corresponding to a second group including one or more elemental task throughputs during the second time section; and (c) comparing the first representative task throughput and the second representative task throughput and then, if the second representative task throughput is determined to be greater than the first representative task throughput by an amount equal to or greater than a preset first threshold value, increasing the maximum thread value for the second time section and setting it as a maximum thread value for a third time section.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
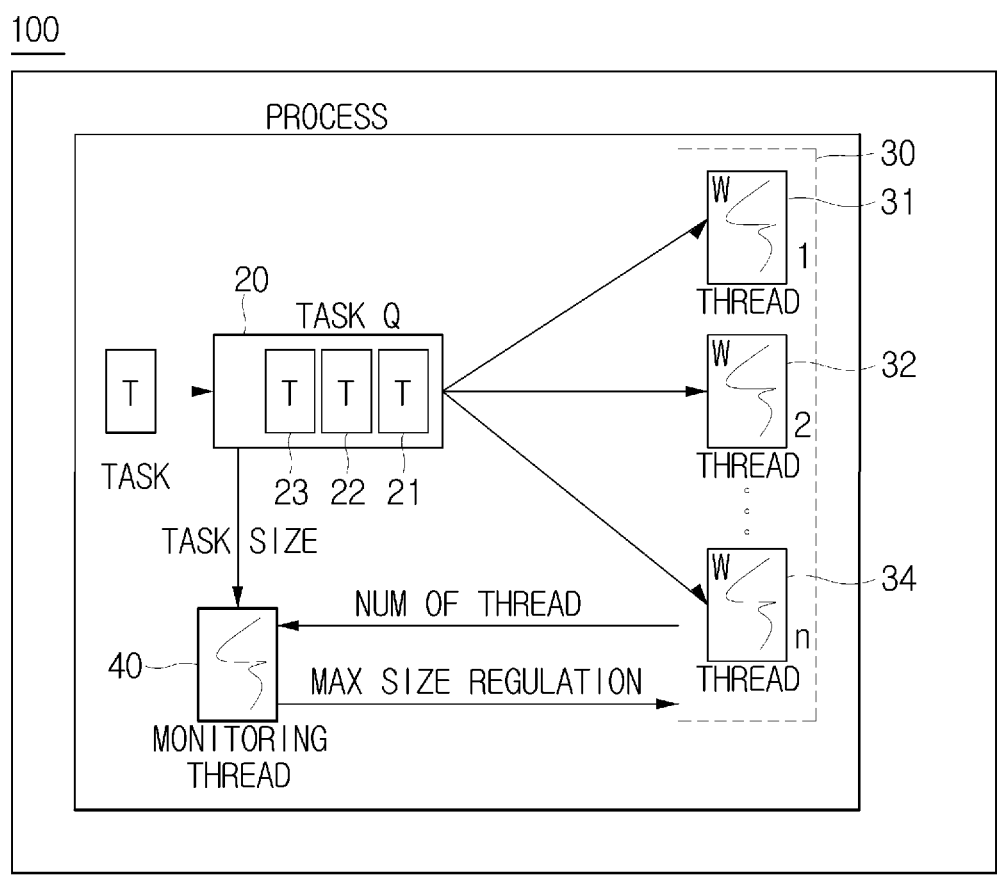
FIG. 1 is a conceptual diagram schematically illustrating a method for a computing device dynamically managing a size of a thread pool in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

FIG. 1 is a conceptual diagram schematically illustrating a method for a computing device 100 dynamically managing a size of a thread pool 30 in accordance with one example embodiment of the present invention.

Figure 2:
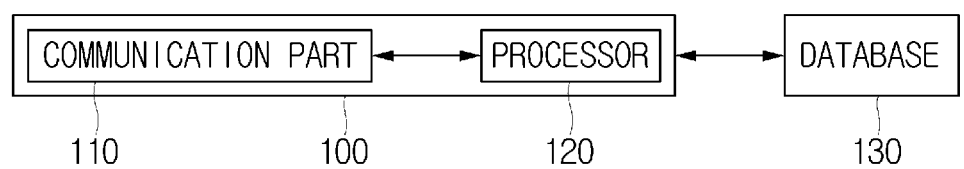
FIG. 2 is a block diagram of the computing device in accordance with one example embodiment of the present invention.

FIG. 2 is a block diagram of the computing device 100 in accordance with one example embodiment of the present invention.

First of all, as illustrated in FIG. 2, the computing device 100 of the present invention may include a communication part 110 and a processor 120, and, as the case may be, may further include a database 130 to be mentioned later, although not illustrated in FIG. 2.

Herein, the computing device 100, which manages dynamically the size of the thread pool, is a digital equipment, and any digital equipment that has a processor and computing capacity may be adopted as the computing device 100 in accordance with the present invention. Especially, the computing device 100 may be implemented as a web server that provides a service in response to a request from a client.

The communication part 110 is configured to acquire a task request. For example, if there is a certain request from the client, the communication part 110 may acquire such a task request.

The processor 120 will be explained about later in detail.

The database 130 may be accessible by the communication part 110 of the computing device 100.

Also, by referring to FIG. 1, it is shown that the processor 120 of the computing device 100 manages at least one process for execution of a program, and also manages the task queue 20 that includes one or more tasks 21, 22, and 23, and the thread pool 30 that includes one or more threads 31, 32, 33, and 34. The processor 120 may allocate at least one task to the at least one of the threads 31, 32, 33, and 34 to thereby allow the task to be executed. Herein, the thread means a worker thread.

The threads fewer than a preset maximum thread value may be created to be included in the thread pool 30, and the processor 120 may retrieve the task from the task queue 20 and allocate it to the thread included in the thread pool 30. A thread which have completed a processing of a task may not be discarded but may stand by in the thread pool till an allocation of a next task.

The thread pool 30 may manage the maximum thread value that represents a maximum retainable number of threads and the minimum thread value that represents a minimum retainable number of threads.

However, as an appropriate minimum or maximum number of threads is hard to be determined in a web environment that changes fast in real-time, the computing device 100 in accordance with one example embodiment of the present invention regulates the maximum thread value in real-time by a method as follows.

The computing device 100 in accordance with one example embodiment of the present invention may allow a monitoring thread 40 to perform a function of regulating the maximum thread value of the thread pool 30 by checking statuses of the task queue 20 and the thread pool 30 in real-time. For reference, FIG. 1 illustrates the monitoring thread 40 as not included in the thread pool 30, but it is not limited to this.

Specifically, the monitoring thread 40 may monitor whether the number of the threads included in the thread pool 30 approaches a current maximum thread value within a certain range. If the number of the threads included in the thread pool 30 approaches the current maximum thread value within the certain range, the monitoring thread 40 may slowly increase the current maximum thread value (a so-called first increase). In this case, as the current number of threads may not be enough for efficient processing of the tasks piling up, the maximum thread value is slowly increased to extend the current number of threads.

Specifically, the current maximum thread value may be increased (the so-called first increase), by referring to the number of CPU cores. Further, if at least one condition is satisfied after the first increase, the maximum thread value is increased again by referring to the number of CPU cores (a so-called second increase).

Herein, the expression that the number of CPU cores is referred to means that the maximum thread value is increased by the amount identical to the number of CPU cores or by the amount more or less based on the number of CPU cores.

Herein, the reason that the maximum thread value is slowly increased is that the CPU usage of the respective task allocated to each thread is not known. A single task request may have an idle time during which the CPU is not used and a work time during which computation is actually performed by the CPU. If many tasks with long idle times are inputted, more threads must be created by increasing the maximum thread value. However, creating more threads by suddenly increasing the maximum thread value by a large amount may have a bad influence on performance of the system due to a context switching and, therefore, slow increase of the maximum thread value is recommended for ensuring stability of the system and maximum performance. This also applies to tasks with short idle times and long work times.

On the other hand, the processor 120 of the computing device 100 may increase the current maximum thread value (the so-called first increase), if the number of the threads included in the thread pool 30 approaches the current maximum thread value within the certain range. Herein, the increased maximum thread value may be stored in the database 130.

For example, in case the current maximum thread value is one hundred, the processor 120 may support the monitoring thread 40 to check whether the number of threads in the thread pool 30, which includes the number of threads with allocated tasks, is equal to or greater than ninety nine, i.e. ninety nine percent of the maximum thread value. For example, in case the number of threads in the thread pool 30 is equal to or greater than ninety nine, the processor 120 may support the monitoring thread 40 to increase the current maximum thread value to one hundred and twenty and store a status of the increased maximum thread value in the database 130.

In this way, if the number of threads included in the thread pool 30 approaches the maximum thread value within the certain range, though not identical to the maximum thread value, the processor 120 may support the monitoring thread 40 to increase the maximum thread value to prevent saturation of the threads.

Clearly, if the number of the threads included in the thread pool 30 is identical to the current maximum thread value, the processor 120 may support the monitoring thread 40 to increase and store the current maximum thread value in the database 130.

Herein, a process of increasing the current maximum thread value includes (i) creating new threads corresponding to the increased maximum thread value and putting them in the thread pool 30, and (ii) acquiring a new task from the task queue 20 and allocating it to at least one of the newly created threads.

Figure 3:
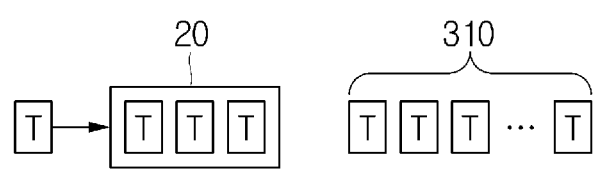
FIG. 3 is a diagram illustrating requests outputted from a task queue in accordance with one example embodiment of the present invention.

FIG. 3 is a diagram illustrating tasks 310 outputted from the task queue 20 in accordance with one example embodiment of the present invention.

Figure 4A:
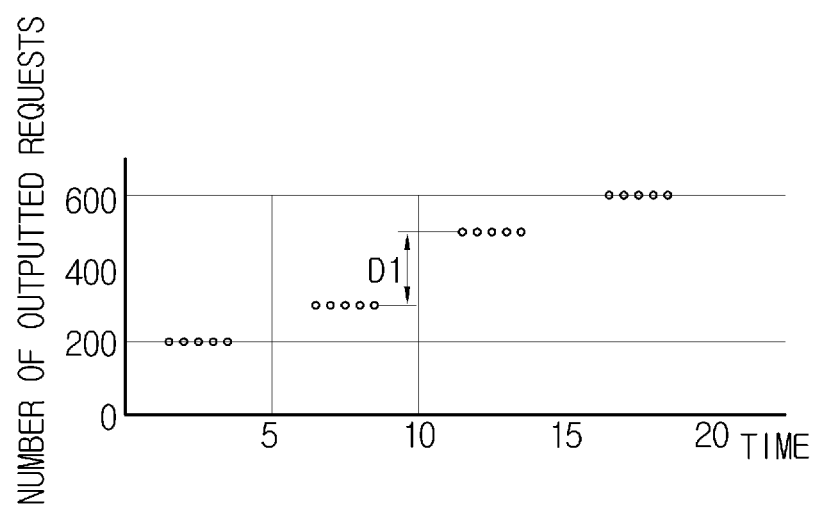
FIGS. 4A and 4B are graphs illustrating elemental task throughputs grouped by stated intervals in accordance with one example embodiment of the present invention.
Figure 4B:
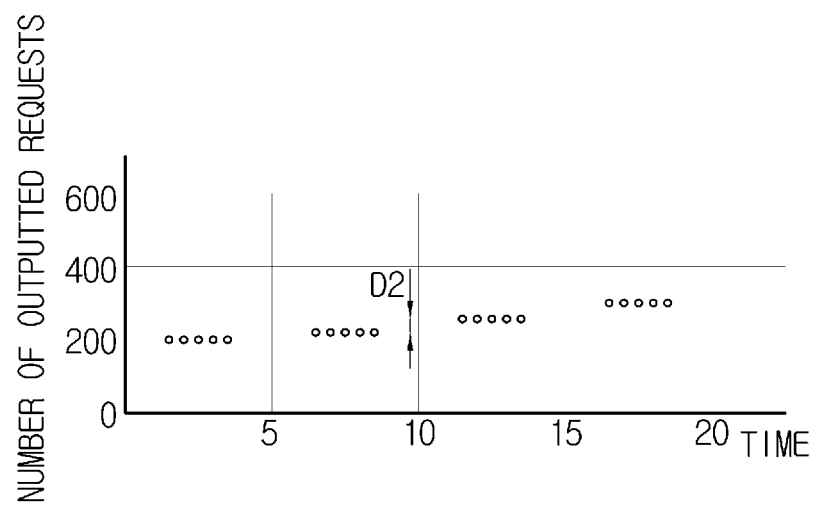

FIGS. 4A and 4B are graphs illustrating elemental task throughputs grouped by stated intervals in accordance with one example embodiment of the present invention.

The computing device 100 may perform a function of calculating at least one representative task throughput corresponding to at least one group including one or more elemental task throughputs during each corresponding time section. Herein, each of the elemental task throughputs means, by referring to FIG. 3, the number of the requests 310 outputted from the task queue 20 per unit time. After the tasks allocated to the threads are finished, new tasks in the task queue 20 are outputted and allocated to each thread, and therefore, the number of requests outputted from the task queue 20 may be used to estimate the number of requests processed by the thread pool 30.

In other words, each of the elemental task throughputs may be the number of requests outputted from the task queue 20 per unit time, and the processor 120 of the computing device 100 may calculate the at least one representative task throughput corresponding to at least one group including the elemental task throughputs during each corresponding time section. By referring to FIGS. 4A and 4B, respective points shown in the graphs are the elemental task throughputs, each of which is the number of requests outputted from the task queue 20 per unit time. By referring to FIGS. 4A and 4B, it is assumed that there are four groups at five second intervals during a total of twenty seconds.

By referring to FIGS. 4A and 4B, each of the representative task throughputs of each of the groups may represent at least one of an average value of elemental task throughputs during five seconds, a value of elemental task throughput with the greatest number of requests outputted during the five seconds, a value of elemental task throughput with the least number of requests outputted during the five seconds, and a value of elemental task throughput with an arbitrary number of requests outputted during the five seconds.

On the other hand, the computing device 100 may compare a first representative task throughput corresponding to a first group including one or more elemental task throughputs during a first time section, i.e., a time section before an increase of the maximum thread value, with a second representative task throughput corresponding to a second group including one or more elemental task throughputs during a second time section, i.e., a time section after an increase of the maximum thread value.

In detail, by referring to FIGS. 4A and 4B, the first representative task throughput corresponding to the first group with its elemental task throughputs within five-to-ten-second duration and the second representative task throughput corresponding to the second group with its elemental task throughput within ten-to-fifteen-second duration may be compared.

Thereafter, if the second representative task throughput is determined to be greater than the first representative task throughput by an amount equal to or greater than a preset first threshold value, the processor 120 may increase the maximum thread value and set it as a maximum thread value for a next time section. The purpose of this is to find the acceptable number of threads by increasing the number of threads.

In case of FIG. 4A, it is shown that a difference of the second representative task throughput and the first representative task throughput is D1, and in case of FIG. 4B, it is D2. If it is assumed that the preset first threshold value is greater than D2 and less than D1, in case of FIG. 4A, the maximum thread value may be increased after the second time section, i.e., a time section from ten to fifteen seconds, and in case of FIG. 4B, it may not be increased.

This is because in case of FIG. 4A, the maximum thread value is increased because the acceptable number of threads is not found yet, and in case of FIG. 4B, the maximum thread value is not increased because the acceptable number of threads, considering performance of CPU, already exists in the thread pool 30 and increasing the number of threads may not guarantee expansion of the task throughput, e.g., the representative task throughput.

On the other hand, the representative task throughput may be an average value of the elemental task throughputs included in the corresponding group, but it is not limited to this.

For example, the computing device 100 may perform a function of acquiring a first mean value of the elemental task throughputs included in the first group as the first representative task throughput and a second mean value of the elemental task throughputs included in the second group as the second representative task throughput, and the computing device 100 may perform a function of comparing the first and the second mean values, and, if the second mean value is greater than the first mean value by an amount equal to or greater than a preset second threshold value, the computing device 100 may increase the maximum thread value for the next time section.

Herein, the second threshold value may be identical to or different from the first threshold value.

Figure 5:
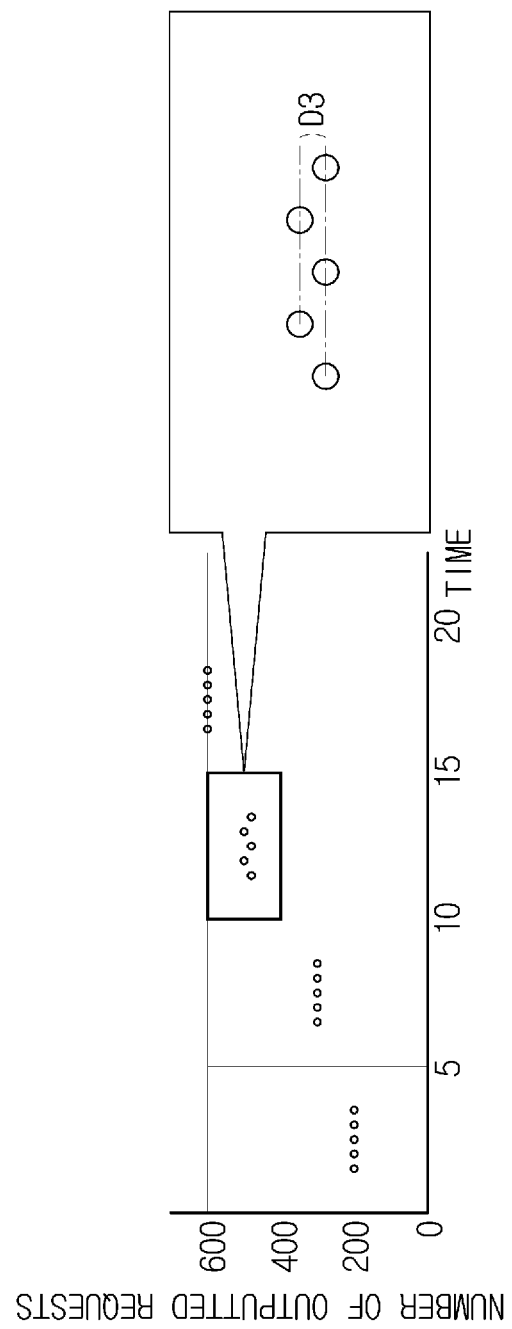
FIG. 5 is an exemplary diagram illustrating a verification of stationarity of a group including elemental task throughputs in accordance with one example embodiment of the present invention.

FIG. 5 is an exemplary diagram illustrating a verification of stationarity of the elemental task throughputs in the corresponding group in accordance with one example embodiment of the present invention.

The processor 120 may refer to a degree of fluctuation of the elemental task throughputs included in the second group during the second time section after the increase of the maximum thread value (the so-called first increase), and accordingly determine whether the stationarity is satisfied by using an algorithm of a stationarity of time series. For example, if the fluctuation is detected to be in a certain range, the processor 120 determines that the stationarity is satisfied.

Herein, the algorithm of a stationarity of time series may be used to verify whether a certain subject is stable over time to a certain degree, and may be commonly divided into a unit root test and a cointegration test. As a major algorithm of the stationarity of time series, there is a Dickey-Fuller Test that falls under the unit root test.

If the stationarity with regard to the second time section is satisfied, the processor 120 may calculate the second representative task throughput corresponding to the second group with its elemental task throughputs during the second time section and then the processor 120 may compare the second representative task throughput with the first representative task throughput. If the second representative task throughput is determined to be greater than the first representative task throughput by an amount equal to or greater than the preset first threshold value, the processor 120 may increase the maximum thread value (the so-called second increase) and set it as a maximum thread value for the next time section.

The reason of considering the stationarity is as follows: Since the elemental task throughputs may fluctuate right after the maximum thread value is increased, the elemental task throughputs after the increase should be compared with the elemental task throughputs before the increase only after the fluctuation of the elemental task throughputs is determined to have subsided following a certain condition.

Herein, whether the stationarity is satisfied may be determined by the algorithm of the stationarity of time series, e.g., the Dickey-Fuller Test.

The fluctuation may be considered as stable only when it is within a certain range. For example, if standard deviation is less than five percent of an average of the amplitude of the fluctuation, it may be determined to be stable.

Further, as can be seen in FIG. 5, by letting D3 be a certain range of difference among the amplitudes that satisfies the stationarity and looking at an enlarged portion where the elemental task throughputs included in the corresponding group right after the ten-second-point are, it may be seen that the stationarity is satisfied as the difference between an elemental task throughput with the greatest value and an elemental task throughput with the least value is less than D3. After the stationarity is determined to be satisfied after the increase in the maximum thread value, the processor 120 may determine whether the maximum thread value should be increased again for the next time section by comparing the representative task throughput after the increase with that before the increase.

On the other hand, the case where the stationarity is not satisfied is explained below.

If the stationarity for elemental task throughputs included in a k-th group during a k-th time section is not satisfied, the processor 120 determines whether or not stationarity for elemental task throughputs included in a (k+1)th group during a (k+1)th time section is satisfied without increasing a maximum thread value for the (k+1)th time section.

It is because that the number of requests during the k-th time section does not reflect the actual request throughputs if the elemental task throughputs included in the k-th group fluctuates beyond a certain range. Consequently, if the stationarity for the k-th group is not satisfied, the processor 120 may determine whether or not the (k+1)th group is satisfied without increasing the maximum thread value for the (k+1)th time section.

Similarly, if the stationarity for the (k+1)th group is not satisfied, the processor 120 may determine whether or not a stationarity for a (k+2)th group during a (k+2)th time section is satisfied without increasing a maximum thread value for the (k+2)th time section.

Meanwhile, if it is assumed that the stationarity for the m-th group and that for the (m+1)th group are satisfied and thus the maximum thread value should be increased, an amount of the maximum thread value to be increased may be determined by referring to information on how greater a (m+1)th representative task throughput is than the m-th representative task throughput.

For example, if the preset first threshold value is fifty and the (m+1)th representative task throughput corresponding to the (m+1)th group is greater than the m-th representative task throughput corresponding to the m-th group by two hundred, the amount of increase of the maximum thread value may be greater than that from the case where the difference is one hundred.

Heretofore, whether the maximum thread value should be increased may be determined by comparing the representative task throughputs. However, as another example embodiment of the present invention, whether the maximum thread value should be increased may be determined by comparing the representative task throughputs and by referring to information on a size of the task queue as shown in FIG. 6.

Figure 6:
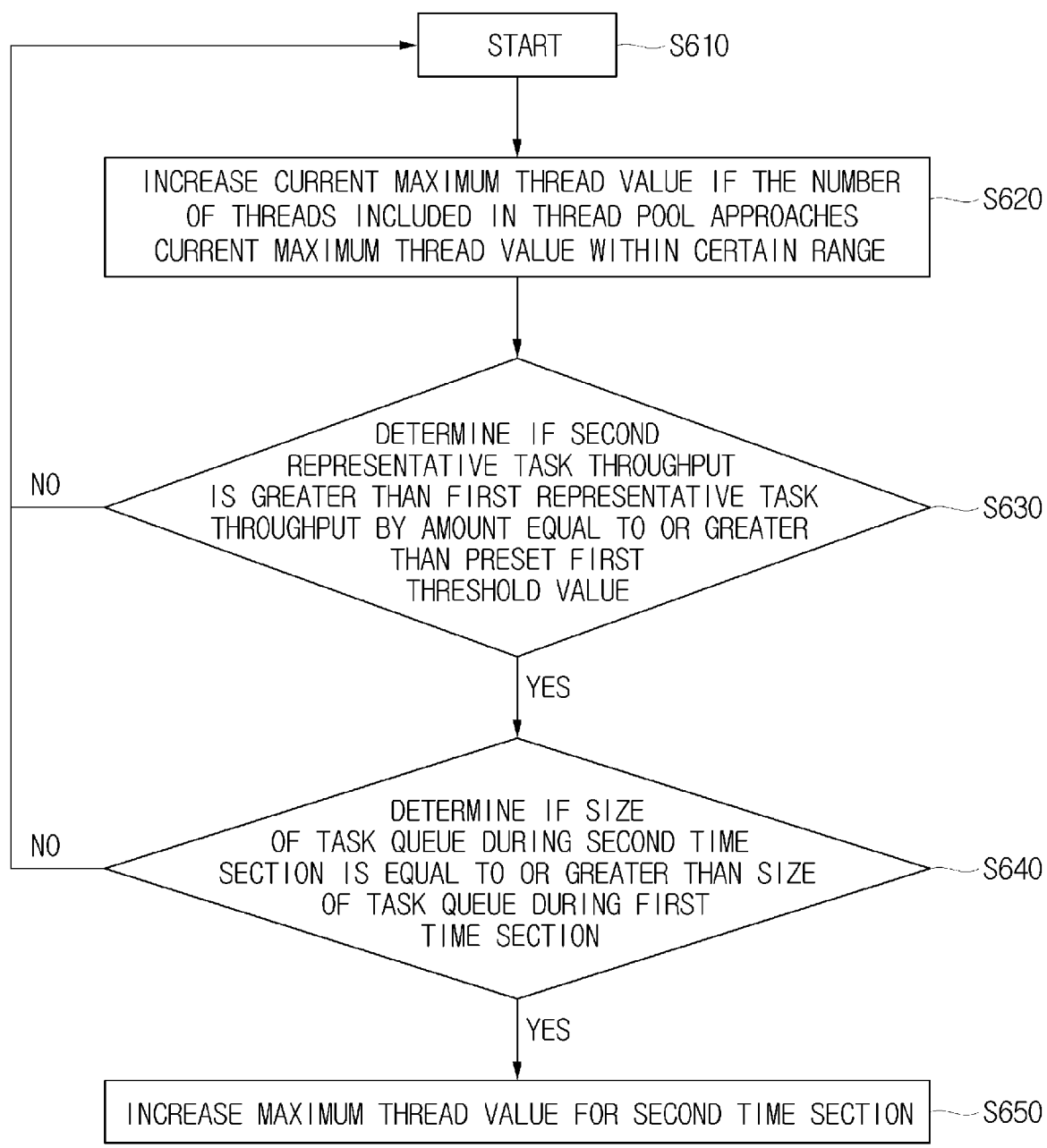
FIG. 6 is a diagram illustrating a progress leading to another increase of a maximum thread value in accordance with another example embodiment of the present invention.

FIG. 6 is a diagram illustrating a progress leading to another increase of the maximum thread value in accordance with another example embodiment of the present invention.

After a process starts at the step of S610, the computing device 100 may increase the maximum thread value (the so-called first increase) if the number of threads included in the thread pool 30 approaches the current maximum thread value within a certain range at the step of S620.

Then, the computing device 100 may determine whether the second representative task throughput corresponding to the second group after the first increase is greater than the first representative task throughput corresponding to the first group by an amount equal to or greater than the first threshold value at the step of S630. If the second representative task throughput is determined not to be greater than the first representative task throughput by the amount equal to or greater than the first threshold value, a monitoring is performed again by returning to the step of S620, and if the second representative task throughput is determined to be greater than the first representative task throughput by the amount equal to or greater than the first threshold value, the process at the step of S640 is performed. For reference, though not illustrated, whether the stationarity is satisfied may be determined via the algorithm of the stationarity of time series before the step of S630.

If the second representative task throughput is determined to be greater than the first representative task throughput by the amount equal to or greater than the first threshold value at the step of S630, the computing device 100 may further refer to the information on the size of the task queue 20. In detail, the computing device 100 may determine whether the size of the task queue 20 after the increase of the maximum thread value is equal to or greater than that before the increase of the maximum thread value, at the step of S640.

If a condition regarding the size of the task queue is satisfied, i.e., if the size of the task queue 20 after the increase of the maximum thread value is equal to or greater than that before the increase of the maximum thread value at the step of S640, the computing device 100 may increase the maximum thread value again (the so-called second increase) at the step of S650.

Hereinafter, the condition regarding the size of the task queue will be explained in more detail.

If the size of the task queue 20 is not changed even though the maximum thread value is increased, this is a case where the size of the task queue 20 is not changed even though new threads are created according to the increase of the maximum thread value and then the tasks in the task queue 20 are allocated to the new threads. This means that the current number of threads is insufficient for the processing of the incoming tasks. Thus, it can be considered to be similar to a case where the size of the task queue 20 is increased.

For example, if the processor 120 instructs the monitoring thread 40 to increase the current maximum thread value to one hundred and twenty, the processor 120 may instruct the monitoring thread 40 to compare the size of the task queue 20 when the maximum thread value is one hundred with that when the maximum thread value is increased to one hundred and twenty. If the size of the task queue 20 with the maximum thread value of one hundred is greater than that with the maximum thread value of one hundred and twenty, the maximum thread value may be increased to one hundred and forty and may be stored in the database 130. In this case, the reason of increasing the maximum thread value to one hundred and forty is that the number of tasks included in the task queue 20 has not been reduced even though the number of the threads has been increased to one hundred and twenty.

If the condition only regarding the size of the task queue is considered, in case of a CPU usage at one hundred percent, proper response may not be possible. In case of the CPU usage at one hundred percent, more threads do not guarantee improved request throughput, which may result in uninterrupted increase of the size of the task queue 20. In this case, the computing device 100 may stop the increase of the maximum thread value by further referring to information on the throughput. That is, the computing device 100 may stop the increase of the maximum thread value if the throughput is determined as not increased after the maximum thread value is increased.

On the other hand, the processor 120 may include multi-cores and may execute the monitoring thread 40 and a plurality of worker threads by using the multi-cores. In this case, it may be implemented that one of the multi-cores operates the monitoring thread 40 and the rest of the cores operate the threads, or that several cores operate the monitoring thread 40 or the threads in turn. Further, a single core may be implemented to operate the monitoring thread 40 and the thread in turn.

The database 130 of the computing device 100 that manages the size of the thread pool 30 dynamically may store various data required for such a management. First of all, the task queue 20 may reside in a memory and may store pointers to data of the tasks. Further, the database 130 may store data of the threads and may be used for context switching of the threads. Further, the database 130 may store the size of the task queue 20, the maximum thread value and the minimum thread value corresponding to the thread pool 30.

The present invention has an effect of providing a technology that can improve efficacy of a system by determining an optimal size of the thread pool in a web environment that changes fast in real-time.

The present invention has another effect of providing a solution to a problem of uninterrupted increase of the sizes of the threads and the task queues, even if the CPU usage is at one hundred percent, that occurs when an optimal number of maximum threads is determined by considering only the size of the task queues based on the number of requests outputted from the task queues.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for managing a thread pool size dynamically by using one or more elemental task throughputs which represent the number of requests per unit time outputted from a task queue, the unit time being included in a first time section and a second time section, comprising steps of:
   a computing device assigning a plurality of tasks of the task queue to a plurality of threads of the thread pool and executing the plurality of threads during the first and second time sections; and
   preventing uninterrupted increase of a maximum number of threads of the thread pool by dynamically adjusting the maximum number of threads of the thread pool comprising:
   (a) the computing device performing a function of calculating at least one first representative task throughput corresponding to a first group including a plurality of elemental task throughputs during the first time section, and then increasing the maximum number of threads of the thread pool for the first time section and setting it as the maximum number of threads of the thread pool for the second time section;
   (b) the computing device performing a function of calculating at least one second representative task throughput corresponding to a second group including a plurality of elemental task throughputs during the second time section; and
   (c) the computing device performing a function of comparing the first representative task throughput and the second representative task throughput and then, if the second representative task throughput is determined to be greater than the first representative task throughput by an amount equal to or greater than a preset first threshold value, increasing the maximum number of threads of the thread pool for the second time section and setting it as the maximum number of threads of the thread pool value for a third time section,
   wherein, at the step of (b), the computing device determines whether or not a condition for a degree of stationarity of the elemental task throughputs in the second group is satisfied or not by using an algorithm of a stationarity of time series, where the algorithm determines whether the elemental task throughputs during the second time section fall under a certain range, and wherein, if the condition is satisfied, at the step of (c), the computing device performs the function of comparing the first representative task throughput and the second representative task throughput.

2. The method of claim 1, wherein, if the condition is not satisfied, at the step of (b), the computing device determines whether or not a condition for a degree of stationarity of elemental task throughputs in a third group for the third time section is satisfied, without increasing the maximum number of threads for the third time section.

3. The method of claim 1, wherein the algorithm of the stationarity of time series includes a Dickey-Fuller test.

4. The method of claim 1, wherein the step of (a) includes steps of:
   (a1) the computing device creating at least one first new thread whose cardinal number amounts to increase of the maximum number of threads for the first time section and putting the first new thread in the thread pool; and
   (a2) the computing device acquiring a new task from the task queue and allocating it to the first new thread, and
   wherein the step of (c) includes steps of:
   (c1) the computing device creating at least one second new thread whose cardinal number amounts to increase of the maximum number of threads for the second time section and putting the second new thread in the thread pool; and
   (c2) the computing device acquiring a new task from the task queue and allocating it to the second new thread.

5. The method of claim 1, wherein, at the step of (a), the computing device performs a function of acquiring a first mean value of the elemental task throughputs included in the first group as the first representative task throughput, wherein, at the step of (b), the computing device performs a function of acquiring a second mean value of the elemental task throughputs included in the second group as the second representative task throughput, and wherein, at the step of (c), the computing device performs a function of comparing the first and the second mean values, and, if the second mean value is greater than that the first mean value by an amount equal to or greater than a preset second threshold value, increasing the maximum number of threads for the second time section.

6. The method of claim 1, wherein, at the step of (a), if the number of threads included in the thread pool approaches the maximum number of threads within a specified range, the computing device increases the maximum number of threads for the first time section and sets it as the maximum number of threads for the second time section.

7. The method of claim 1, wherein, at the steps of (a) and (c), the respective maximum number of threads to be increased are determined by referring to the number of CPU cores.

8. The method of claim 1, wherein, at the step of (a), the computing device allows a monitoring thread to increase the maximum number of threads.

9. The method of claim 1, wherein, at the step of (c), an amount of the maximum number of threads to be increased is determined by referring to information on how greater the second representative task throughput is than the first representative task throughput.

10. The method of claim 1, wherein, at the step of (c), the computing device increases the maximum number of threads for the second time section (i) if the second representative task throughput is determined to be greater than the first representative task throughput by an amount equal to or greater than the first preset threshold, and (ii) if a size of the task queue during the second time section is equal to or greater than that during the first time section.

11. A computing device for managing a thread pool size dynamically by using one or more elemental task throughputs which represent the number of requests per unit time outputted from a task queue, the unit time being included in a first time section and a second time section, comprising:
assigning a plurality of tasks of the task queue to a plurality of threads of the thread pool and executing the plurality of threads during the first and second time sections; and
preventing uninterrupted increase of a maximum number of threads of the thread pool by dynamically adjusting the maximum number of threads of the thread pool comprising:
a processor for performing a function of (a) calculating at least one first representative task throughput corresponding to a first group including a plurality of elemental task throughputs during the first time section, and then increasing the maximum number of threads for the first time section and setting it as the maximum number of threads for the second time section;
the processor performing a function of (b) calculating at least one second representative task throughput corresponding to a second group including a plurality of elemental task throughputs during the second time section; and
the processor performing a function of (c) comparing the first representative task throughput and the second representative task throughput and then, if the second representative task throughput is determined to be greater than the first representative task throughput by an amount equal to or greater than a preset first threshold value, increasing the maximum number of threads for the second time section and setting it as the maximum number of threads for a third time section,
wherein, at the step of (b), the processor determines whether or not a condition for a degree of stationarity of the elemental task throughputs in the second group is satisfied or not by using an algorithm of a stationarity of time series, where the algorithm determines whether the elemental task throughputs during the second time section fall under a certain range, and wherein, if the condition is satisfied, at the step of (c), the processor performs the function of comparing the first representative task throughput and the second representative task throughput.

12. The computing device of claim 11, wherein, if the condition is not satisfied, when performing the function of (b), the processor determines whether or not a condition for a degree of stationarity of elemental task throughputs in a third group for the third time section is satisfied, without increasing the maximum number of threads for the third time section.

13. The computing device of claim 11, wherein the algorithm of the stationarity of time series includes a Dickey-Fuller test.

14. The computing device of claim 11, wherein the function of (a) includes functions of the processor:
(a1) creating at least one first new thread whose cardinal number amounts to increase of the maximum number of threads for the first time section and putting the first new thread in the thread pool; and
(a2) acquiring a new task from the task queue and allocating it to the first new thread, and
wherein the function of (c) includes functions of the processor:
(c1) creating at least one second new thread whose cardinal number amounts to increase of the maximum number of threads for the second time section and putting the second new thread in the thread pool; and
(c2) acquiring a new task from the task queue and allocating it to the second new thread.

15. The computing device of claim 11, wherein, when performing the function of (a), the processor performs a function of acquiring a first mean value of the elemental task throughputs included in the first group as the first representative task throughput, wherein, when performing the function of (b), the processor performs a function of acquiring a second mean value of the elemental task throughputs included in the second group as the second representative task throughput, and wherein, when performing the function of (c), the processor performs a function of comparing the first and the second mean values, and, if the second mean value is greater than that the first mean value by an amount equal to or greater than a preset second threshold value, increasing the maximum number of threads for the second time section.

16. The computing device of claim 11, wherein, when performing the function of (a), if the number of threads included in the thread pool approaches the maximum number of threads within a specified range, the processor increases the maximum number of threads for the first time section and sets it as the maximum number of threads for the second time section.

17. The computing device of claim 11, wherein, when performing the functions of (a) and (c), the respective maximum number of threads to be increased are determined by referring to the number of CPU cores.

18. The computing device of claim 11, wherein, when performing the function of (a), the processor allows a monitoring thread to increase the maximum number of threads.

19. The computing device of claim 11, wherein, when performing the function of (c), an amount of the maximum number of threads to be increased is determined by referring to information on how greater the second representative task throughput is than the first representative task throughput.

20. The computing device of claim 11, wherein, when performing the function of (c), the processor increases the maximum number of threads for the second time section (i) if the second representative task throughput is determined to be greater than the first representative task throughput by an amount equal to or greater than the first preset threshold, and (ii) if a size of the task queue during the second time section is equal to or greater than that during the first time section.

* * * * *